US007881203B2

(12) United States Patent
Ohsako et al.

(10) Patent No.: US 7,881,203 B2
(45) Date of Patent: Feb. 1, 2011

(54) TERMINAL REGULATION MANAGEMENT DEVICE

(75) Inventors: Syuhei Ohsako, Fukuoka (JP); Yohji Fukuzawa, Fukuoka (JP); Tsutomu Miyagaki, Fukuoka (JP); Tatsuhiko Takata, Fukuoka (JP); Kousuke Sakamoto, Fukuoka (JP); Noriaki Taniguchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 11/892,098

(22) Filed: Aug. 20, 2007

(65) Prior Publication Data
US 2008/0056134 A1     Mar. 6, 2008

(30) Foreign Application Priority Data
Aug. 30, 2006   (JP)   .............................. 2006-233913

(51) Int. Cl.
G01R 31/08     (2006.01)
G06F 11/00     (2006.01)
G08C 15/00     (2006.01)
H04J 1/16      (2006.01)
H04J 3/14      (2006.01)
H04L 1/00      (2006.01)
H04L 12/26     (2006.01)
H04Q 7/00      (2006.01)
H04L 12/28     (2006.01)
H04L 12/56     (2006.01)

(52) U.S. Cl. ...................... 370/235; 370/328; 370/395.4
(58) Field of Classification Search ................. 370/310, 370/329, 395.4, 395.42, 229–235, 328; 455/166.2, 455/343.4, 435.3, 512
See application file for complete search history.

(56) References Cited

U.S. PATENT DOCUMENTS 6,018,656 A * 1/2000 Shirai .......................... 455/418

(Continued)

FOREIGN PATENT DOCUMENTS

EP     1 626 603    2/2006

(Continued)

OTHER PUBLICATIONS

Material for the investigation commission on the use of information communication systems in times of disaster; Jun. 27, 2003 with Eng. Translation.

(Continued)

*Primary Examiner*—Seema S Rao
*Assistant Examiner*—Xavier Szewai Wong
(74) *Attorney, Agent, or Firm*—Fujitsu Patent Center

(57) ABSTRACT

A terminal regulation management device capable of flexibly managing terminals in times of unexpected incident, to ensure communications of users whose daily life zone overlaps with the site of the incident and of users whose daily life zone is outside the site. A priority information memory stores, with respect to each base station, priority information indicating priority levels as to subscribers' incoming/outgoing calls and including communication counts that the subscribers have communicated using their radio terminals. A communication information receiver receives communication information on the terminal communications from a radio network controller for controlling the base stations. A priority decision unit updates the communication counts stored in the memory, based on the received communication information, and determines the priority order of the priority information in accordance with the updated communication counts. A priority information transmitter transmits the priority information stored in the priority information memory to the base stations.

16 Claims, 18 Drawing Sheets

U.S. PATENT DOCUMENTS

| | | | |
|---|---|---|---|
| 6,097,700 A * | 8/2000 | Thornberg et al. | 370/233 |
| 6,788,926 B1 * | 9/2004 | Frangione et al. | 455/405 |
| 7,554,954 B2 * | 6/2009 | Hosein et al. | 370/335 |
| 2003/0058796 A1 * | 3/2003 | Anderson, Sr. | 370/236 |
| 2003/0115335 A1 * | 6/2003 | Yoshida et al. | 709/228 |
| 2004/0127226 A1 * | 7/2004 | Dugad et al. | 455/450 |
| 2004/0240642 A1 | 12/2004 | Crandell et al. | |
| 2005/0174953 A1 * | 8/2005 | Ho | 370/310 |
| 2005/0186961 A1 * | 8/2005 | Aikawa et al. | 455/435.1 |
| 2005/0201308 A1 * | 9/2005 | Sekiya et al. | 370/310 |
| 2008/0247358 A1 * | 10/2008 | Damnjanovic et al. | 370/329 |
| 2009/0116386 A1 * | 5/2009 | Fischbeck et al. | 370/232 |

FOREIGN PATENT DOCUMENTS

| | | |
|---|---|---|
| FR | 2832585 | 5/2003 |
| JP | 05-316039 | 11/1993 |
| JP | 08-116360 | 5/1996 |
| JP | 01-169360 | 6/2001 |
| JP | 04-023648 | 1/2004 |

OTHER PUBLICATIONS

"Extended European Search Report", mailed by EPO and corresponding to European application No. 07113922.4 on Nov. 25, 2010.

* cited by examiner

43 PREFERENTIAL SUBSCRIBER INFO TABLE

| Subscriber c | Count = 101 | Permission Flag |
|---|---|---|
| Subscriber 1 | Count = 100 | Permission Flag |
| Subscriber a | Count = 99 | Permission Flag |
| Subscriber n | Count = 99 | Permission Flag |
| . : | . : | . : |
| Subscriber b | Count = XX | Permission Flag |

FIG. 8

43 PREFERENTIAL SUBSCRIBER INFO TABLE

| Subscriber c | Count = 101 | Permission Flag =1 |
|---|---|---|
| Subscriber 1 | Count = 100 | Permission Flag =1 |
| Subscriber a | Count = 99 | Permission Flag =1 |
| Subscriber n | Count = 99 | Permission Flag =1 |
| . : | . : | . : |
| Subscriber 10 | Count = 99 | Permission Flag =1 |
| . : | . : | . : |
| Subscriber x | Count = XX | Permission Flag =0 |

FIG. 9

45 PREFERENTIAL SUBSCRIBER NO. TABLE

| Congestion Level | Permitted No. |
|---|---|
| 90< Level ≦ 100 | 0 |
| 80< Level ≦ 90 | 10 |
| 70< Level ≦ 80 | 20 |
| 50< Level ≦ 70 | 30 |
| 30< Level ≦ 50 | 40 |

FIG. 10

47 REGULATION MANAGEMENT TABLE

| Subscriber a | Regulation Flag |
|---|---|
| Subscriber b | Regulation Flag |
| Subscriber c | Regulation Flag |
| Subscriber 1 | Regulation Flag |
| ⋮ | ⋮ |
| Subscriber n | Regulation Flag |

FIG. 11

TERMINAL REGULATION MANAGEMENT DEVICE

CROSS-REFERENCE TO RELATED APPLICATIONS

This application is based upon and claims the benefits of priority from the prior Japanese Patent Application No. 2006-233913, filed on Aug. 30, 2006, the entire contents of which are incorporated herein by reference.

BACKGROUND OF THE INVENTION

1. Field of the Invention

The present invention relates to terminal regulation management devices, and more particularly, to a terminal regulation management device for regulating incoming/outgoing calls of radio terminals.

2. Description of the Related Art

W-CDMA (Wideband-Code Division Multiple Access) is a communication scheme using a wider frequency band than the existing CDMA and has the advantages of faster data transfer rate and higher communication quality.

In W-CDMA network systems, if the communication traffic of a certain base station increases because of an event (e.g., a fireworks festival, concert, sport event or the like), call congestion or communication degradation possibly occurs, making communications unavailable. For example, if the number of channels simultaneously transmitted and received by a base station increases, the level of interference power interfering with the individual radio communication channels in the frequency band rises, making it impossible to maintain the communication quality.

Thus, before the communication quality becomes uncontrollable, incoming/outgoing calls of mobile units existing in the radio communication area are regulated. When the incoming/outgoing call regulation is initiated, the base station sends the mobile units the information that the incoming/outgoing calls are being regulated, and the incoming/outgoing calls of the mobile units are rejected by the base station.

Usually, the incoming/outgoing call regulation is applied equally to all mobile units, but there has been proposed a technique of preferentially connecting previously registered mobile units during congestion (see, e.g., Japanese Unexamined Patent Publication No. 05-316039). A technique is also known in which those mobile units of which the count of outgoing calls to an identical number per unit time is large are preferentially connected (see, e.g., Japanese Unexamined Patent Publication No. 2004-23648). Further, the outgoing call regulation explained below is actually performed. Individual mobile units are automatically grouped at the time of purchase, and during congestion, the number of groups whose outgoing calls are permitted is restricted in accordance with the degree of congestion and the regulated groups are changed at fixed intervals of time (see, e.g., "Material for the investigation commission on the use of information communication systems in times of disaster" (online), Tohoku Bureau of Telecommunications, Ministry of Internal Affairs and Communications (searched on May 10, 2006, Internet URL: http://www.ttb.go.jp/saigai/houkoku/index.html)).

However, the technique disclosed in Japanese Unexamined Patent Publication No. 05-316039 is associated with the problem that when an event such as a fireworks festival is held, even those users whose zone of daily life is near the site of the event are subject to the incoming/outgoing call regulation unless they register their mobile units in advance.

With the technique disclosed in Japanese Unexamined Patent Publication No. 2004-23648, the mobile units of users whose daily life zone differs from the area where they are requesting outgoing call are preferentially treated in accordance with the outgoing call count per unit time, whereas the mobile units of users who live in that area are subject to the incoming/outgoing call regulation.

According to the technique described in the "Material for the investigation commission on the use of information communication systems in times of disaster" (online) by Tohoku Bureau of Telecommunications, Ministry of Internal Affairs and Communications, the incoming/outgoing call regulation is enforced equally on the basis of the groups into which the individual mobile units are placed at the time of contract, without regard to the frequency of use in the daily life zone. A problem therefore arises in that communication is not necessarily secured for the mobile units of those users whose daily life zone overlaps with the call regulation area.

SUMMARY OF THE INVENTION

The present invention was created in view of the above circumstances, and an object thereof is to provide a terminal regulation management device capable of flexibly managing radio terminals even in cases where an unexpected incident has occurred, to secure communication of users whose daily life zone overlaps with the site of the incident as well as of users whose daily life zone is outside the site.

To achieve the object, there is provided a terminal regulation management device for regulating incoming/outgoing calls of radio terminals. The terminal regulation management device comprises a priority information memory storing, with respect to each base station, priority information indicating priority levels as to incoming/outgoing calls of subscribers and including communication counts that the subscribers have communicated using the respective radio terminals, a communication information receiver for receiving communication information about communications of the radio terminals, from the base stations or from a radio network controller for controlling the base stations, a priority decision unit for updating the communication counts stored in the priority information memory, based on the received communication information, and determining an order of priority of the priority information in accordance with the updated communication counts, and a priority information transmitter for transmitting the priority information stored in the priority information memory to the base stations.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 exemplifies the data structure of a preferential subscriber information table.

FIG. 9 exemplifies the data structure of the preferential subscriber information table with flags set.

FIG. 10 exemplifies the data structure of a preferential subscriber number table.

FIG. 11 exemplifies the data structure of a subscriber-based regulation management table.

DESCRIPTION OF THE PREFERRED EMBODIMENTS

The principles of the present invention will be described in detail below with reference to the accompanying drawings.

Figure 1:
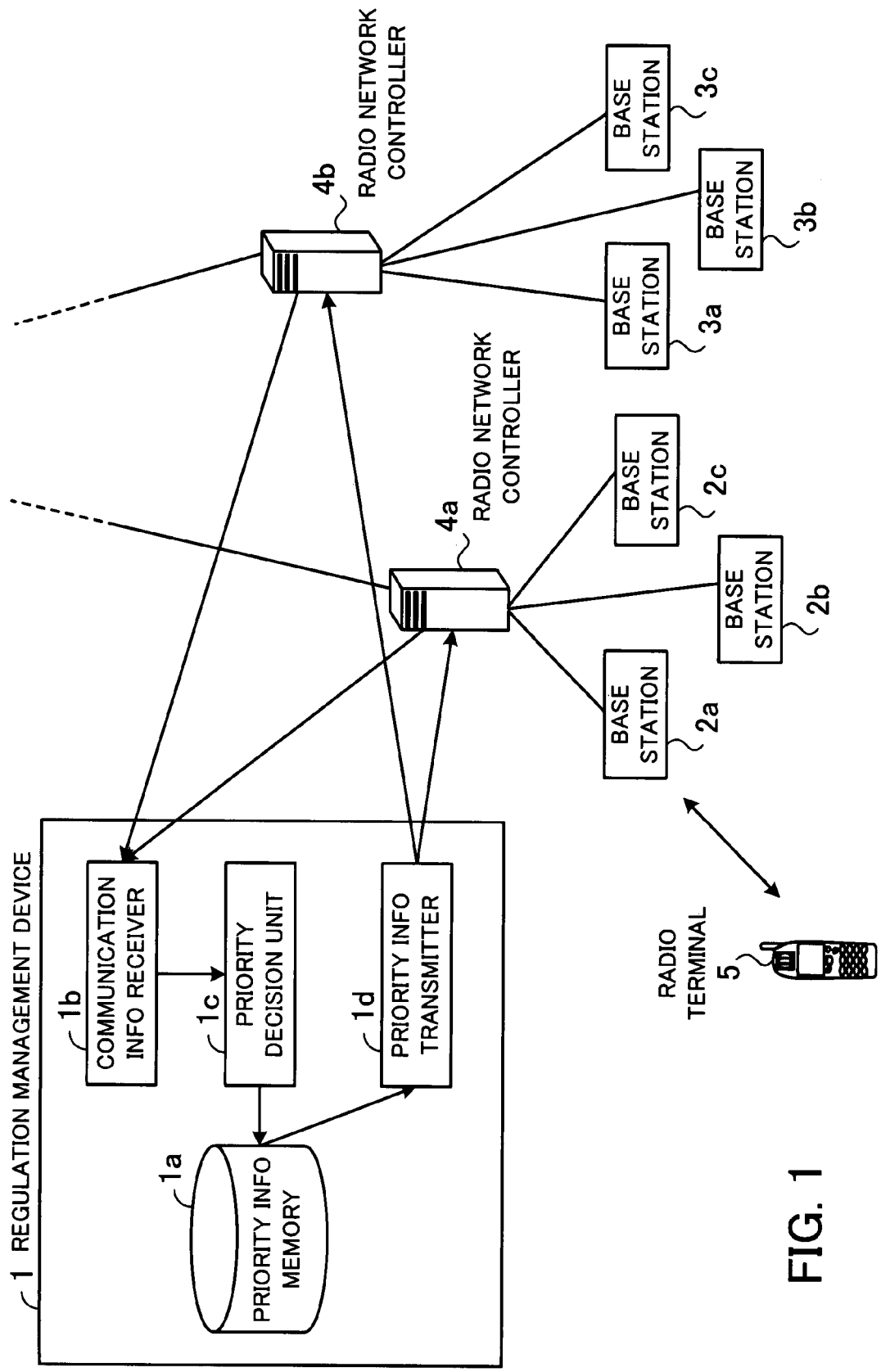
FIG. 1 schematically illustrates a terminal regulation management device.

FIG. 1 schematically illustrates a terminal regulation management device 1, along with base stations 2a to 2c and 3a to 3c, radio network controllers 4a and 4b, and a radio terminal 5.

The terminal regulation management device 1 is connected by wire with the radio network controllers 4a and 4b. The radio network controller 4a is connected by wire with the base stations 2a to 2c, and the radio network controller 4b is connected by wire with the base stations 3a to 3c. The radio network controllers 4a and 4b control their respective subordinate base stations 2a to 2c and 3a to 3c. The radio terminal 5 is capable of communicating by radio with the base stations 2a to 2c and 3a to 3c. In the illustrated example, the radio terminal 5 is located in the cell of the base station 2a and communicates with the base station 2a by radio.

The terminal regulation management device 1 includes a priority information memory 1a, a communication information receiver 1b, a priority decision unit 1c, and a priority information transmitter 1d.

The priority information memory 1a stores, with respect to each of the base stations 2a to 2c and 3a to 3c, priority information indicating priority levels concerning the incoming/outgoing calls of individual subscribers. The priority information includes communication counts that the subscribers have communicated using their respective radio terminals 5.

The priority information memory 1a stores priority information indicating, for example, that among those belonging to the base station 2a, a subscriber a has the communication count "101" and thus is the highest in priority level, subscribers b and c have the communication count "99" and thus are the second highest in priority level, and so on. Similarly, with respect to each base station, the priority information memory 1a stores preferential subscriber information.

The communication information receiver 1b receives communication information about communications of the radio terminal 5 from the radio network controllers 4a and 4b for controlling the base stations 2a to 2c and 3a to 3c. Alternatively, the communication information receiver 1b may receive the communication information directly from the base stations 2a to 2c and 3a to 3c. The communication information includes, for example, information on the base station with which the subscriber communicated, the communication time, the identification information of the subscriber, etc.

The priority decision unit 1c updates the communication counts stored in the priority information memory 1a, on the basis of the communication information received by the communication information receiver 1b. Then, based on the updated communication counts, the priority decision unit determines the order of priority of the priority information.

For example, assuming that the communication information receiver 1b receives communication information about the subscriber b, the priority decision unit 1c updates the communication count of the subscriber b from "99" to "100" and then determines the priority level of the subscriber b based on the updated communication count "100". In this instance, the subscriber b comes after the subscriber a in terms of priority.

The priority information transmitter 1d transmits the priority information stored in the priority information memory 1a to the base stations 2a to 2c and 3a to 3c via the radio network controllers 4a and 4b. In the cases where the terminal regulation management device 1 is connected directly with the base stations 2a to 2c and 3a to 3c, the priority information may be directly transmitted to the base stations 2a to 2c and 3a to 3c.

In this manner, the terminal regulation management device 1 determines the priority order of subscribers with respect to each of the base stations 2a to 2c and 3a to 3c. Accordingly, even in the cases where an unexpected incident has occurred, for example, the radio terminals can be flexibly managed so as to ensure communications of the users whose daily life zone overlaps with the site of the incident as well as of the users whose daily life zone is outside the site.

An embodiment of the present invention will be now described in detail with reference to the drawings.

Figure 2:
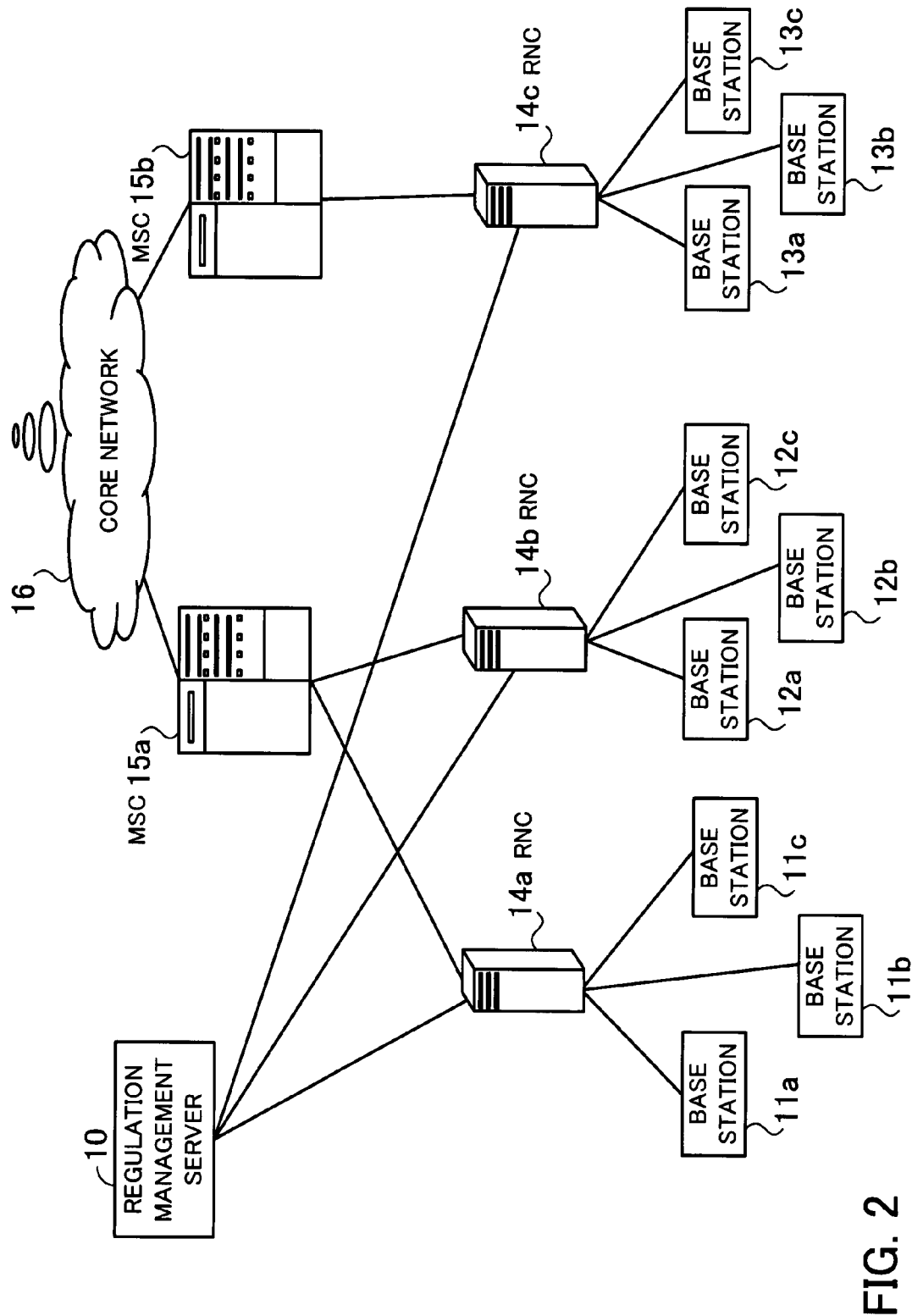
FIG. 2 shows an exemplary system configuration of a radio communication network to which a terminal regulation management server is applied.

FIG. 2 shows an exemplary system configuration of a radio communication network to which a terminal regulation management server is applied. The illustrated network is a W-CDMA radio communication network constituted by a terminal regulation management server 10, base stations 11a to 11c, 12a to 12c and 13a to 13c, RNCs (Radio Network Controllers) 14a to 14c, MSCs (Mobile Switching Centers) 15a and 15b, and a core network 16.

The base stations 11a to 11c are connected by wire to the RNC 14a. Similarly, the base stations 12a to 12c and the base stations 13a to 13c are connected by wire to the RNCs 14b and 14c, respectively.

The RNCs 14a and 14b are connected by wire to the MSC 15a, and the RNC 14c is connected by wire to the MSC 15b.

The MSCs 15a and 15b are connected by wire to the core network 16. The terminal regulation management server 10 is connected by wire with the RNCs 14a to 14c.

Mobile units (radio terminals), not shown, which are cellular phones, for example, exist in the respective cells of the base stations 11a to 11c, 12a to 12c and 13a to 13c. Each of the base stations 11a to 11c, 12a to 12c and 13a to 13c performs W-CDMA radio communication with the mobile units belonging to its own cell. When a mobile unit belonging to the cell of the base station 11a communicates with a mobile unit belonging to the cell of the base station 13a, the two units communicate with each other via the base station 11a, the RNC 14a, the MSC 15a, the core network 16, the MSC 15b, the RNC 14c, and the base station 13a.

The terminal regulation management server 10 receives communication information of the mobile units (subscribers). For example, the terminal regulation management server 10 receives, as the communication information, the identification of the base station with which the subscriber communicated, the communication time (the start time and duration of the communication), the identification of the subscriber, and the location of the cell to which the subscriber belonged.

Based on the received communication information, the terminal regulation management server 10 manages subscriber information such as the counts of subscribers' communications. With respect to each base station, the terminal regulation management server 10 manages the subscriber information.

Where the same subscriber communicates by radio with the base station 11a and then with the base station 12c, for example, the subscriber information such as the communication count is managed in association with each of the base stations 11a and 12c.

In accordance with the subscriber information associated with the respective base stations, the terminal regulation management server 10 determines the order of priority in which the subscribers are allowed to communicate when congestion occurs in the individual base stations. For example, the terminal regulation management server 10 determines the order of priority of the subscribers in descending order of the mobile unit communication count included in the subscriber information. Then, the terminal regulation management server 10 sends information including the determined priority order of subscribers to the RNCs 14a to 14c.

The RNCs 14a to 14c deliver the information on the priority order of subscribers, received from the terminal regulation management server 10, to the respective base stations 11a to 11c, 12a to 12c and 13a to 13c. Where congestion has occurred, the base stations 11a to 11c, 12a to 12c and 13a to 13c individually regulate the incoming/outgoing calls of subscribers in accordance with the priority order notified by the RNCs 14a to 14c.

Thus, the terminal regulation management server 10 manages the subscriber information with respect to each base station and determines the order of priority of subscribers for each base station. Information on the priority order of subscribers thus determined with respect to each base station is then delivered to the corresponding base station. Accordingly, in cases where an event such as a fireworks festival is held, the mobile units can be flexibly managed so as to secure communications of users whose daily life zone overlaps with the event site as well as of users whose daily life zone is outside the event site.

The following describes the functions of the terminal regulation management server 10, RNC 14a, and base station 11a appearing in FIG. 2. First, the function of the terminal regulation management server 10 will be explained.

Figure 3:
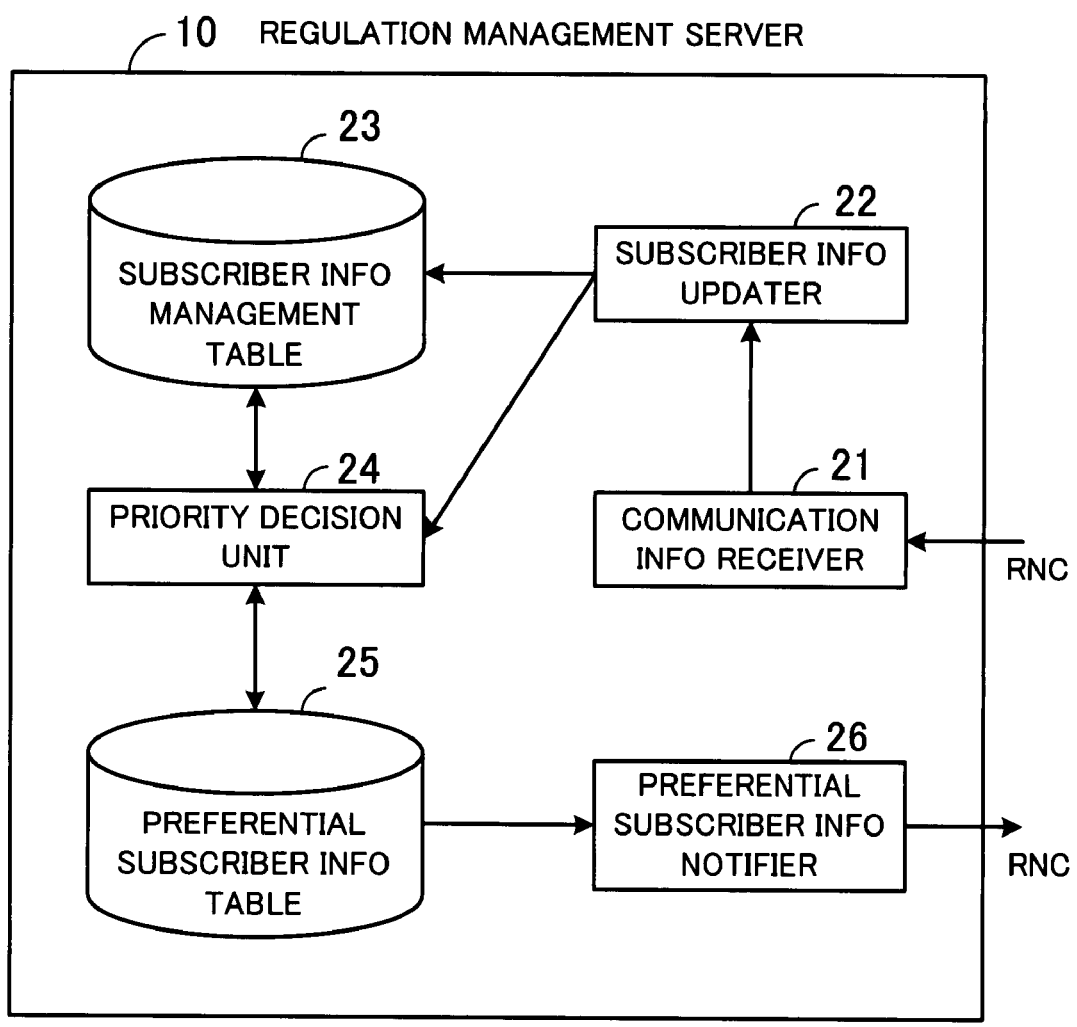
FIG. 3 is a functional block diagram of the terminal regulation management server.

FIG. 3 is a functional block diagram of the terminal regulation management server. As illustrated, the terminal regulation management server 10 includes a communication information receiver 21, a subscriber information updater 22, a station-based subscriber information management table 23, a priority decision unit 24, a station-based preferential subscriber information table 25, and a preferential subscriber information notifier 26.

The communication information receiver 21 receives information about subscribers' communications from the RNCs 14a to 14c.

Based on the communication information received from the communication information receiver 21, the subscriber information updater 22 updates data in the station-based subscriber information management table 23. For example, on receiving communication information, the subscriber information updater 22 increments, by "1", the communication count of the corresponding subscriber stored in the station-based subscriber information management table 23. After updating data in the station-based subscriber information management table 23, the subscriber information updater 22 notifies the priority decision unit 24 that the data has been updated.

The station-based subscriber information management table 23 stores subscriber information with respect to each base station. For example, the station-based subscriber information management table 23 stores, as the subscriber information, subscriber's communication count, communication time, location registration count, cell stay time, handover count, reconnection count, and the like. The station-based preferential subscriber information table 25 holds the subscriber information sorted in order of priority (priority order) in which the incoming/outgoing calls of subscribers are to be permitted during congestion.

The priority decision unit 24 determines the priority order of subscribers on the basis of the station-based subscriber information management table 23 and the station-based preferential subscriber information table 25. Where the communication count of a certain subscriber stored in the station-based subscriber information management table 23 is updated, for example, the priority decision unit 24 updates the corresponding communication count in the station-based preferential subscriber information table 25 and then sorts, in order of priority, the subscriber information then stored in the station-based preferential subscriber information table 25.

Alternatively, the priority decision unit 24 may use other information included in the subscriber information such as the communication time and the location registration, besides the communication count, to determine the priority order of subscribers. In this case, different items of information may be weighted differently. For example, the communication count may be weighted twice as much as the other information.

The preferential subscriber information notifier 26 sends the subscriber information (preferential subscriber information) stored in the station-based preferential subscriber information table 25 and sorted in order of priority, to the corresponding RNCs 14a to 14c at specified intervals of time or in response to a trigger generated by a maintenance engineer, for example. Where the preferential subscriber information stored in the station-based preferential subscriber information table 25 is associated with the cell of the base station 11a shown in FIG. 2, for example, the preferential subscriber information notifier 26 sends the preferential subscriber information to the RNC 14a managing the base station 11a.

An exemplary data structure of the station-based subscriber information management table 23 shown in FIG. 3 will be now described.

Figure 4:
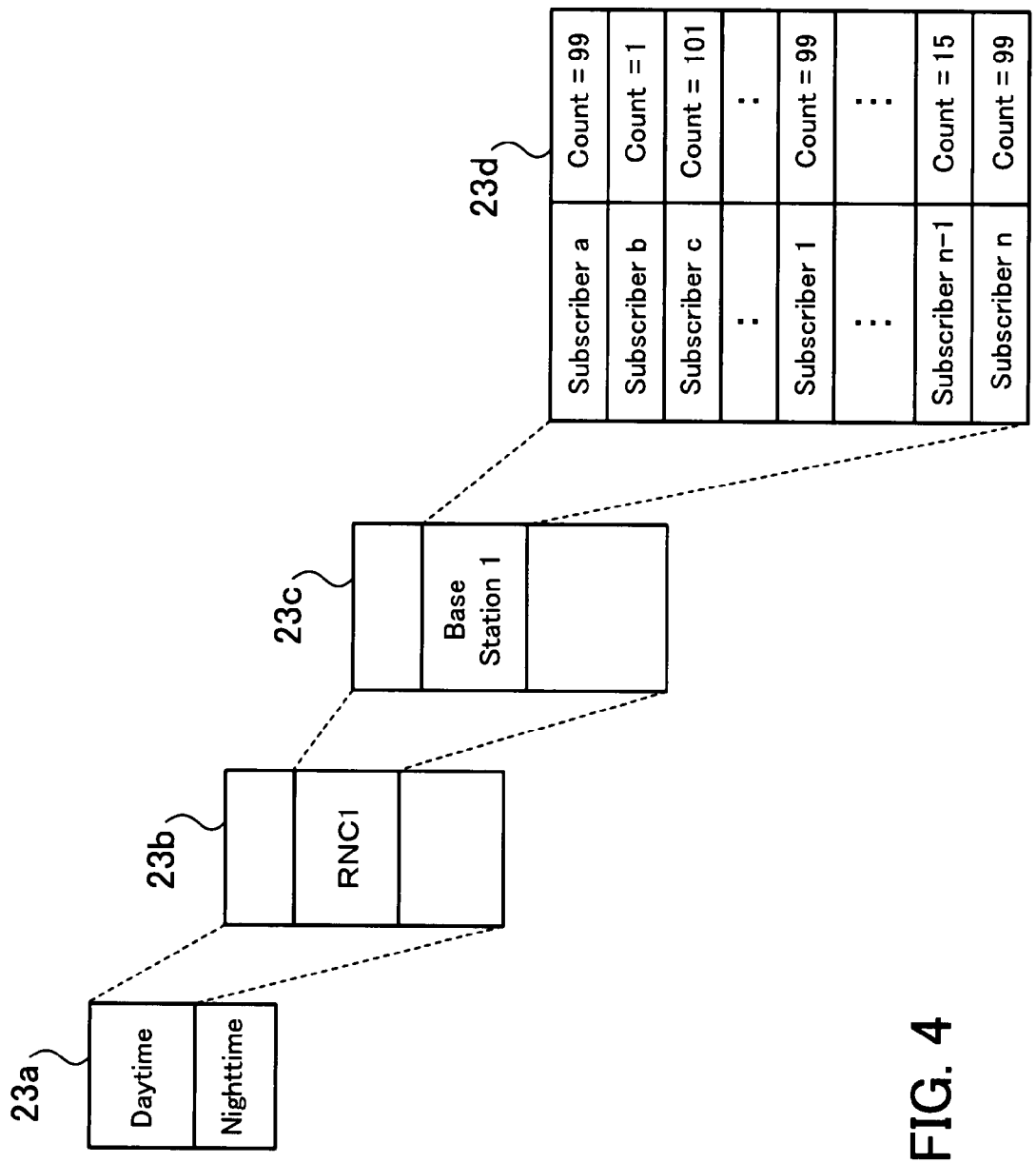
FIG. 4 exemplifies the data structure of a subscriber information management table created for each base station.

FIG. 4 exemplifies the data structure of the station-based subscriber information management table. As indicated by data 23a, the station-based subscriber information management table 23 manages the subscriber information in two separate areas, namely, an area for the daytime zone (e.g., 9:00 to 18:00) and an area for the nighttime zone (e.g., 18:00 to 9:00). The subscriber information updater 22 stores the subscriber information in the daytime area or the nighttime area, depending on the time when the subscriber's communication took place.

Further, with respect to each of the daytime and nighttime zones, the station-based subscriber information management table 23 manages the subscriber information separately for the respective RNCs, as indicated by data 23b. Also, with respect to each RNC, the subscriber information is managed separately for the respective base stations, as indicated by data 23c. Moreover, with respect to each base station, the subscriber information is managed separately for the individual subscribers, as indicated by data 23d. The subscriber information includes the count of subscriber's communications, communication time, location registration count, cell stay time, handover count, reconnection count, etc.; FIG. 4 shows the communication counts only.

Thus, the station-based subscriber information management table 23 manages the use of subscribers' mobile units in a hierarchical fashion, with respect to each time zone, with respect to each RNC in the respective time zones, and with respect to each of the base stations under the management of the respective RNCs.

The subscriber information stored in the station-based subscriber information management table 23 is updated in accordance with the communication information received by the communication information receiver 21. For example, when communication information on the subscriber a is received, the communication count of the subscriber a is updated to "100".

In the above instance, one day is divided into two time zones but may of course be divided into three or more time zones.

An exemplary data structure of the station-based preferential subscriber information table 25 shown in FIG. 3 will be now described.

Figure 5:
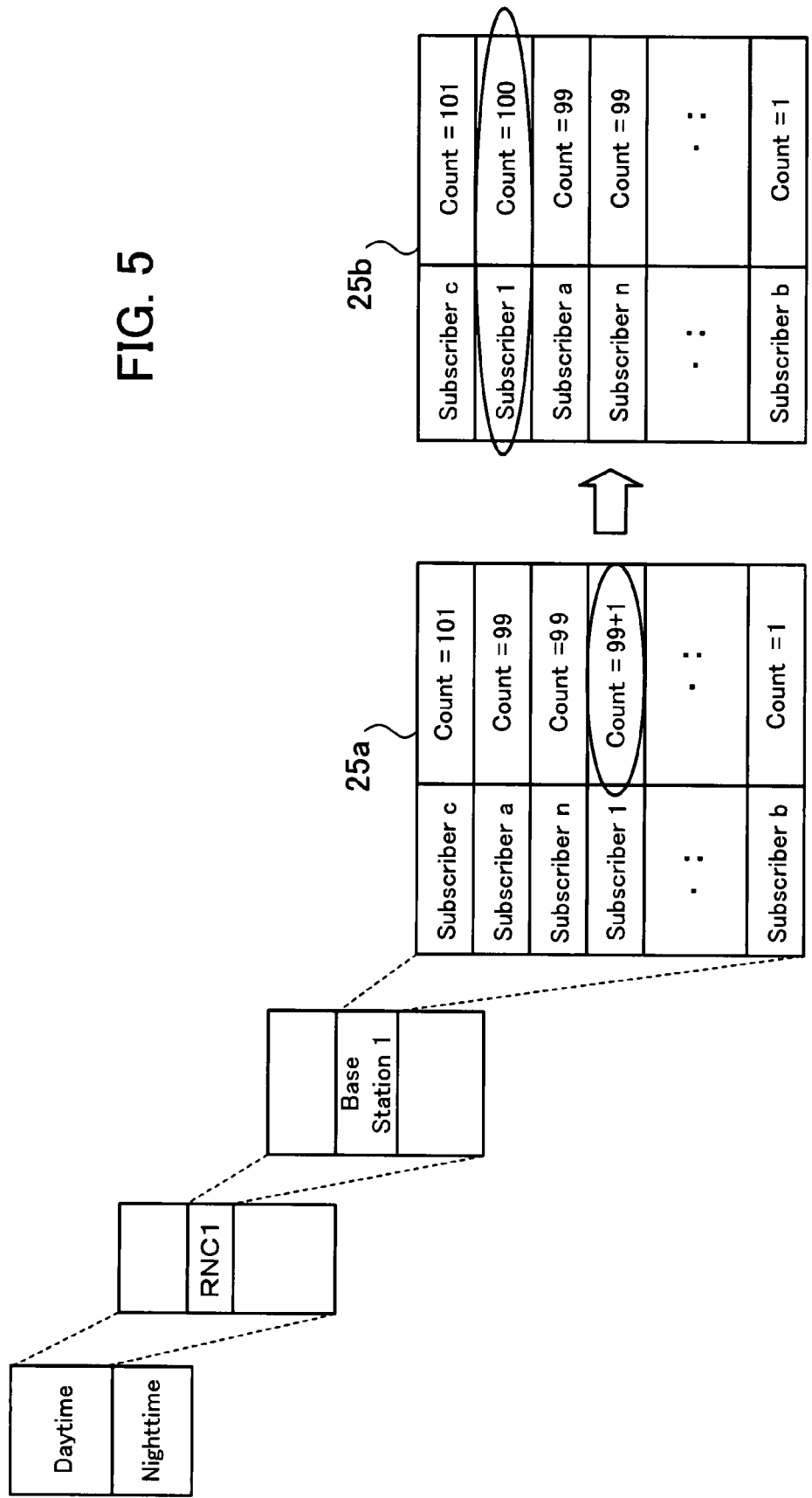
FIG. 5 exemplifies the data structure of a station-based preferential subscriber information table.

FIG. 5 exemplifies the data structure of the station-based preferential subscriber information table. The station-based preferential subscriber information table 25 also manages the subscriber information in a hierarchical manner, like the station-based subscriber information management table 23 explained above with reference to FIG. 4. The subscriber information is, however, sorted in descending order of the communication count. Namely, the subscriber information is sorted in order of priority in which the incoming/outgoing calls of subscribers are to be permitted during congestion (preferential subscriber information). The preferential subscriber information includes the subscriber's communication count, communication time, location registration count, cell stay time, handover count, reconnection count, etc.; FIG. 5 shows only the communication counts.

When certain subscriber information stored in the station-based subscriber information management table 23 is updated, the priority decision unit 24 updates the corresponding subscriber information in the station-based preferential subscriber information table 25. For example, if the communication count of the subscriber 1 belonging to the base station 1 under the management of the RNC 1, as shown in FIG. 5, is updated from "99" to "100" during the daytime, the priority decision unit 24 searches the station-based preferential subscriber information table 25 successively for the daytime zone, the RNC 1, the base station 1 and the subscriber 1, and adds "1" to the communication count of the subscriber 1. Then, the priority decision unit 24 sorts the preferential subscriber information based on the updated communication count. In this instance, the communication count of the subscriber 1 is updated from "99" to "100", as indicated by data 25a and 25b, and therefore, the priority level of the subscriber 1 comes second after the subscriber c.

The function of the RNC 14a shown in FIG. 2 will be now described.

Figure 6:
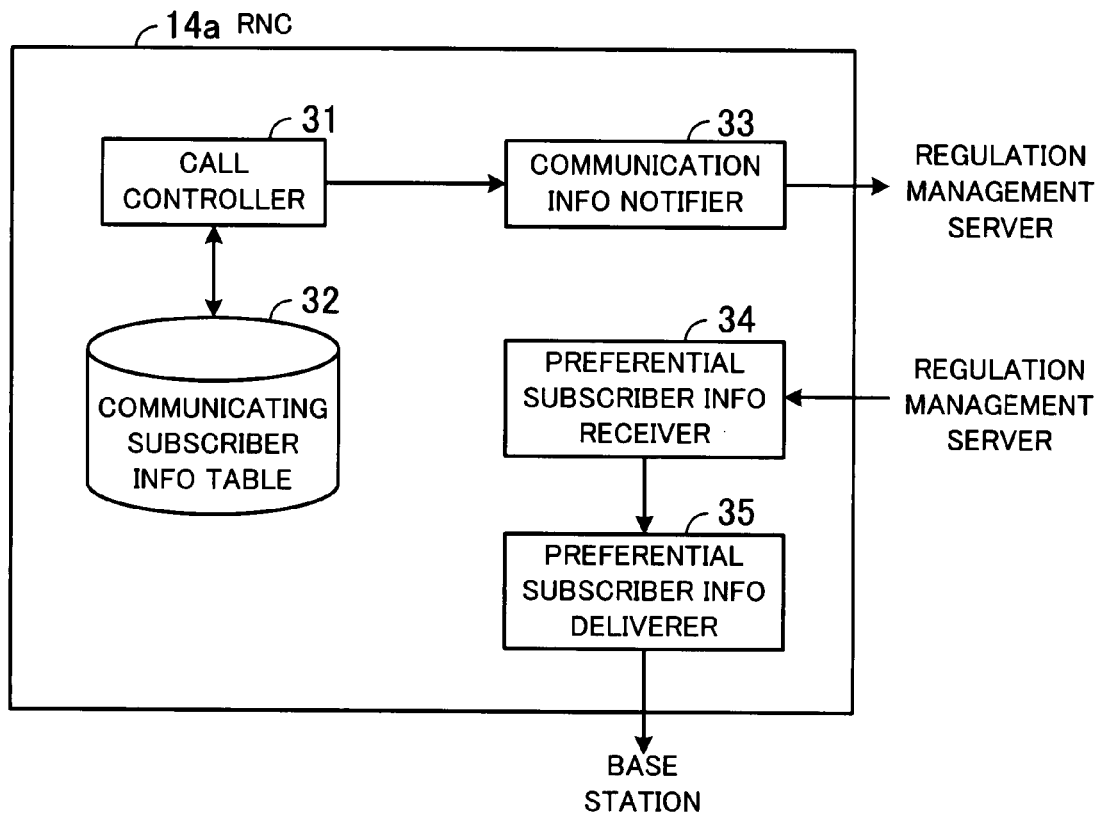
FIG. 6 is a functional block diagram of an RNC.

FIG. 6 is a functional block diagram of the RNC. As illustrated, the RNC 14a includes a call controller 31, a calling subscriber information table 32, a communication information notifier 33, a preferential subscriber information receiver 34, and a preferential subscriber information deliverer 35.

The call controller 31 controls calls of mobile units and also records communication information about subscribers' communications in the calling subscriber information table 32. Further, the call controller 31 outputs the communication information to the communication information notifier 33.

The calling subscriber information table 32 holds the communication information about subscribers' communications, recorded by the call controller 31. The call processing of the call controller 31 and the recording of communication information in the calling subscriber information table 32 are known in the art.

The communication information notifier 33 transmits the communication information output from the call controller 31 to the terminal regulation management server 10. The communication information transmitted from the communication information notifier 33 is received by the communication information receiver 21 of the terminal regulation management server 10. Consequently, the station-based subscriber information management table 23 is updated as explained above with reference to FIG. 4.

The preferential subscriber information receiver 34 receives the preferential subscriber information sent from the preferential subscriber information notifier 26 of the terminal regulation management server 10.

The preferential subscriber information deliverer 35 delivers the preferential subscriber information received by the preferential subscriber information receiver 34 and associated with each base station, to the corresponding base station.

In the above, the RNC 14a alone is explained, but the other RNCs 14b and 14c also have the same function as the RNC 14a.

The function of the base station 11a appearing in FIG. 2 will be now described.

Figure 7:
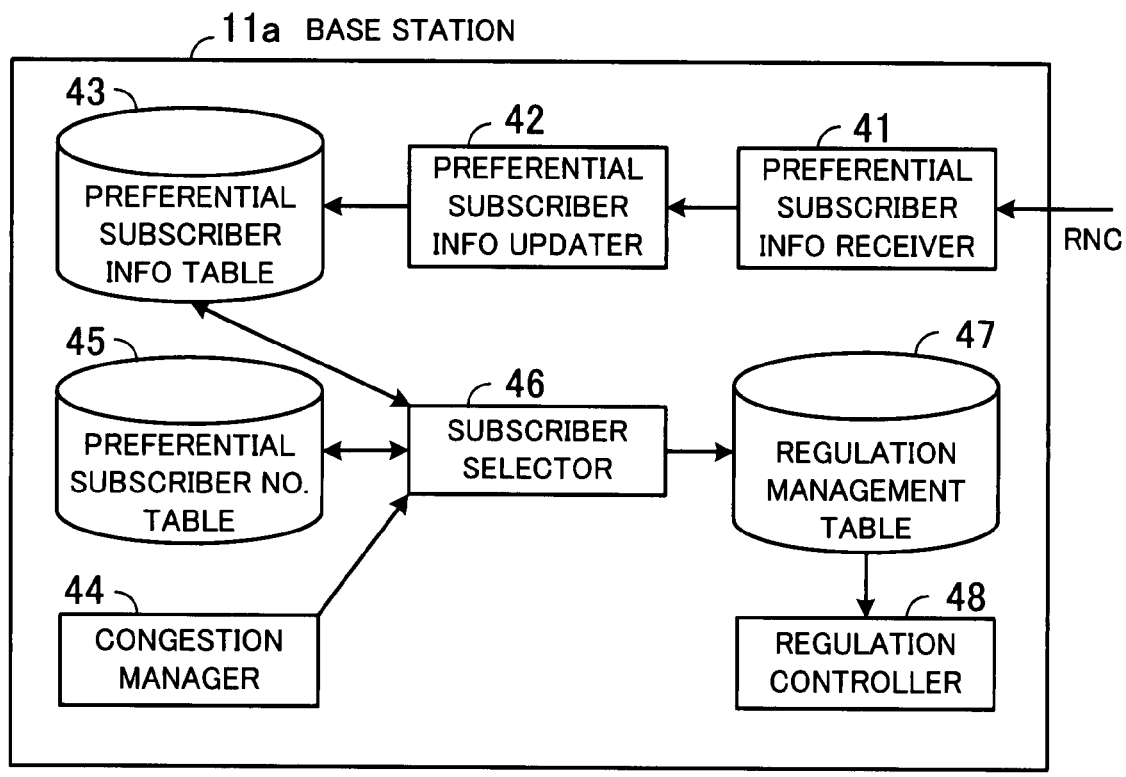
FIG. 7 is a functional block diagram of the base station.

FIG. 7 is a functional block diagram of the base station. As illustrated, the base station 11a includes a preferential subscriber information receiver 41, a preferential subscriber information updater 42, a preferential subscriber information table 43, a congestion manager 44, a preferential subscriber number table 45, a subscriber selector 46, a subscriber-based regulation management table 47, and a regulation controller 48.

The preferential subscriber information receiver 41 receives the preferential subscriber information sent from the RNC 14a. The received preferential subscriber information is output to the preferential subscriber information updater 42.

The preferential subscriber information updater 42 updates data in the preferential subscriber information table 43 in accordance with the preferential subscriber information received from the preferential subscriber information receiver 41.

The preferential subscriber information table 43 stores information about preferential subscribers (subscribers whose incoming/outgoing calls are to be preferentially permitted during congestion) within the coverage of the base station 11a.

The congestion manager 44 monitors the network congestion level in terms of traffic amount. Then, the congestion manager 44 notifies the subscriber selector 46 of the monitored network congestion level.

The preferential subscriber number table 45 stores, in association with different congestion levels, numbers of subscribers whose incoming/outgoing calls are to be permitted during congestion. The numbers are set, for example, by a maintenance engineer such that the number of permitted subscribers is small when the congestion level is high, and is large when the congestion level is low.

In accordance with the congestion state of the base station 11a monitored by the congestion manager 44, the subscriber selector 46 acquires, from the preferential subscriber number table 45, an applicable number of subscribers whose incoming/outgoing calls are to be permitted. The subscriber selector 46 then updates data in the subscriber-based regulation management table 47 such that the highest-priority subscribers corresponding in number to the acquired number are selected as the subscribers whose incoming/outgoing calls are to be permitted. The subscriber-based regulation management table 47 stores information about the permission of incoming/outgoing calls of the subscribers belonging to the base station 11a.

Where congestion has occurred, the regulation controller 48 looks up the subscriber-based regulation management table 47 to regulate incoming/outgoing calls of the mobile units.

In the above, the base station 11a alone is explained, but the other base stations 11b, 11c, 12a to 12c and 13a to 13c also have the same function as the base station 11a.

An exemplary data structure of the preferential subscriber information table 43 shown in FIG. 7 will be now described.

FIG. 8 exemplifies the data structure of the preferential subscriber information table. As illustrated, the preferential subscriber information table 43 stores, for example, identifiers (in the figure, "Subscriber c", "Subscriber 1", "Subscriber a", . . . ) identifying the respective subscribers, the counts of communications of the respective subscribers with the base station 11a, and communication permission flags. The preferential subscriber information table 43 holds the subscriber information in descending order of priority level. In the illustrated example, the subscriber c is the highest in priority, followed by the subscribers 1, a, . . . , b.

The communication permission flags, explained below, are set by the subscriber selector 46.

FIG. 9 exemplifies the data structure of the preferential subscriber information table with the flags set. The subscriber selector 46 explained above with reference to FIG. 7 acquires, from the preferential subscriber number table 45, the number of subscribers whose incoming/outgoing calls are to be permitted, in accordance with the congestion state of the base station 11a acquired from the congestion manager 44. Then, the subscriber selector sets the communication permission flags associated with the highest-priority subscribers corresponding in number to the acquired number to "1". If the number of permitted subscribers is "10", for example, the communication permission flags associated with the ten highest-priority subscribers, starting from the subscriber c, are set to "1".

An exemplary data structure of the preferential subscriber number table 45 shown in FIG. 7 will be now described.

FIG. 10 exemplifies the data structure of the preferential subscriber number table. As illustrated, the preferential subscriber number table 45 stores, with respect to different congestion levels, numbers (permitted numbers) of subscribers whose incoming/outgoing calls are to be permitted. For example, if the congestion level is higher than 90% and lower than or equal to 100%, the number of permitted subscribers is "0". Where the congestion level is higher than 80% and lower than or equal to 90%, the number of permitted subscribers is "10".

The subscriber selector 46 explained above with reference to FIG. 7 acquires the congestion level of the base station 11a from the congestion manager 44, and looks up the preferential subscriber number table 45 to determine the number of subscribers whose incoming/outgoing calls are to be permitted. For example, if the current congestion level of the base station 11a is 83%, the subscriber selector 46 acquires "10" as the number of permitted subscribers, from the preferential subscriber number table 45 shown in FIG. 10.

An exemplary data structure of the subscriber-based regulation management table 47 shown in FIG. 7 will be now described.

FIG. 11 exemplifies the data structure of the subscriber-based regulation management table. As illustrated, the subscriber-based regulation management table 47 stores the identifiers of the subscribers belonging to the base station 11a, and regulation flags associated with the respective subscribers and indicating whether incoming/outgoing calls are permitted or not at the time of congestion. If the regulation flag is, for example, "1" and shows permission, the incoming/outgoing calls of the corresponding subscriber are permitted even during congestion, and if the regulation flag is, for example, "0" and shows non-permission, the incoming/outgoing calls of the corresponding subscriber are not permitted during congestion.

Figure 12:
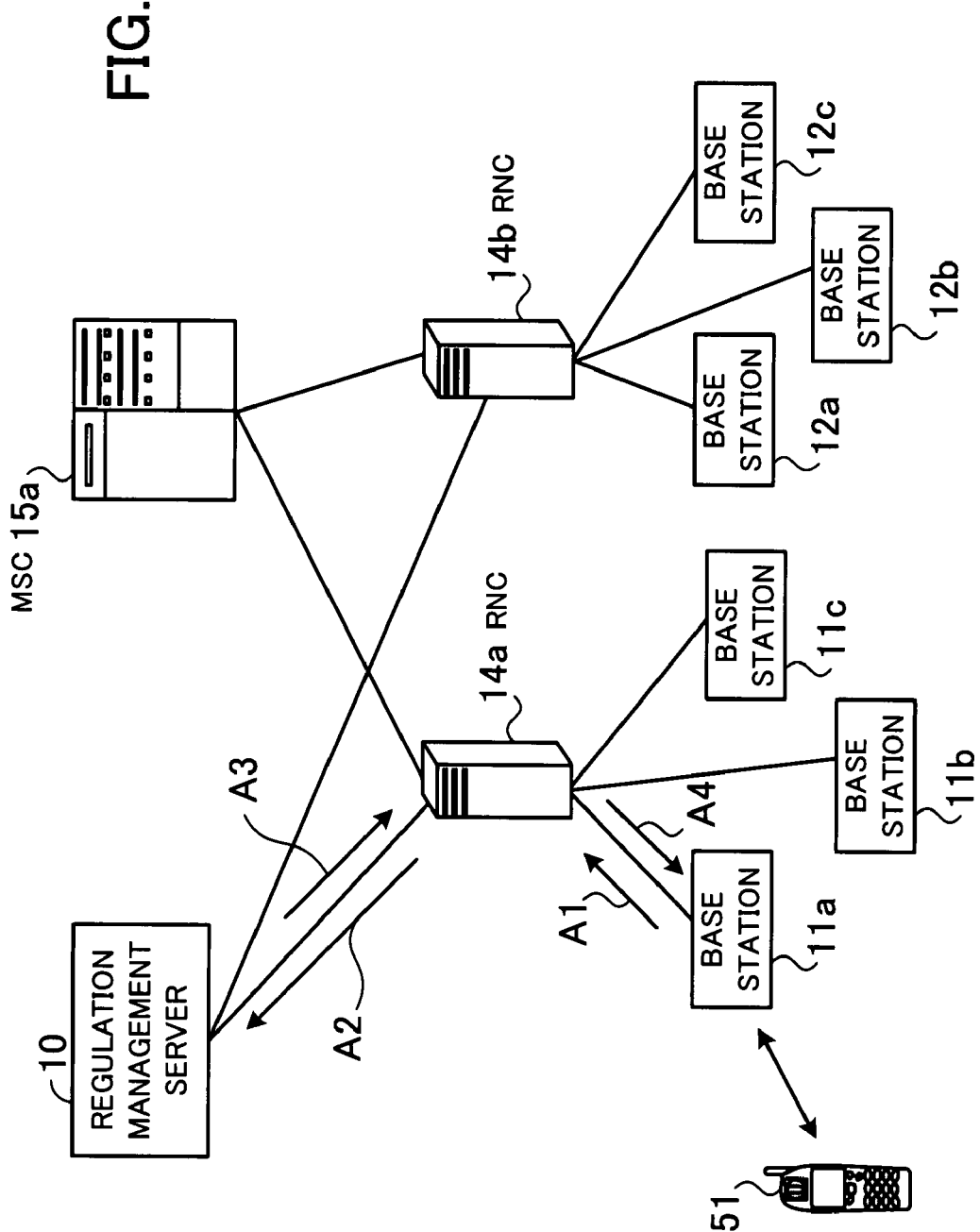
FIG. 12 illustrates the flow of data within the radio network system.

The flow of data within the radio network system will be now described with reference to FIG. 12. In FIG. 12 showing part of the system configuration of FIG. 2, like reference numerals refer to like elements and description of such elements is omitted. Also, in the figure, it is assumed that a mobile unit 51 is located in the cell of the base station 11a and communicates by radio with the base station 11a.

When the call-out button of the mobile unit 51 is depressed by the subscriber, the base station 11a to which the mobile unit 51 belongs sends a call connection request to the host RNC 14a, as indicated by arrow A1.

On receiving the call connection request from the base station 11a, the RNC 14a initiates call control. Then, the RNC 14a transmits communication information including the information about the base station and the subscriber to the terminal regulation management server 10, as indicated by arrow A2.

When the communication information is received from the RNC 14a, the terminal regulation management server 10 updates the subscriber information, such as the subscriber's communication count, communication time and location registration count, in accordance with the received communication information. Then, based on the subscriber information, the terminal regulation management server 10 determines the order of priority of subscribers in accordance with which the incoming/outgoing calls of the subscribers are permitted during congestion.

The terminal regulation management server 10 transmits the preferential subscriber information to the RNC 14a, as indicated by arrow A3, at specified intervals of time or in response to a trigger generated by the maintenance engineer, for example.

On receiving the preferential subscriber information from the terminal regulation management server 10, the RNC 14a transmits the received information to the base station 11a, as indicated by arrow A4.

In accordance with the received preferential subscriber information, the base station 11a permits incoming/outgoing calls of only those subscribers whose priority level is high.

In this manner, when the subscriber starts communication by using the mobile unit 51, the communication information is transmitted from the RNC 14a to the terminal regulation management server 10, as indicated by arrow A2. The terminal regulation management server 10 updates the subscriber information and determines the order of priority of subscribers. Subsequently, the terminal regulation management server 10 transmits the preferential subscriber information to the base station 11a via the RNC 14a, as indicated by arrows A3 and A4. Consequently, the base station 11a can regulate the incoming/outgoing calls of mobile units at the time of congestion.

The operation of the terminal regulation management server 10, RNC 14a and base station 11a will be now explained with reference to sequence diagrams.

Figure 13:
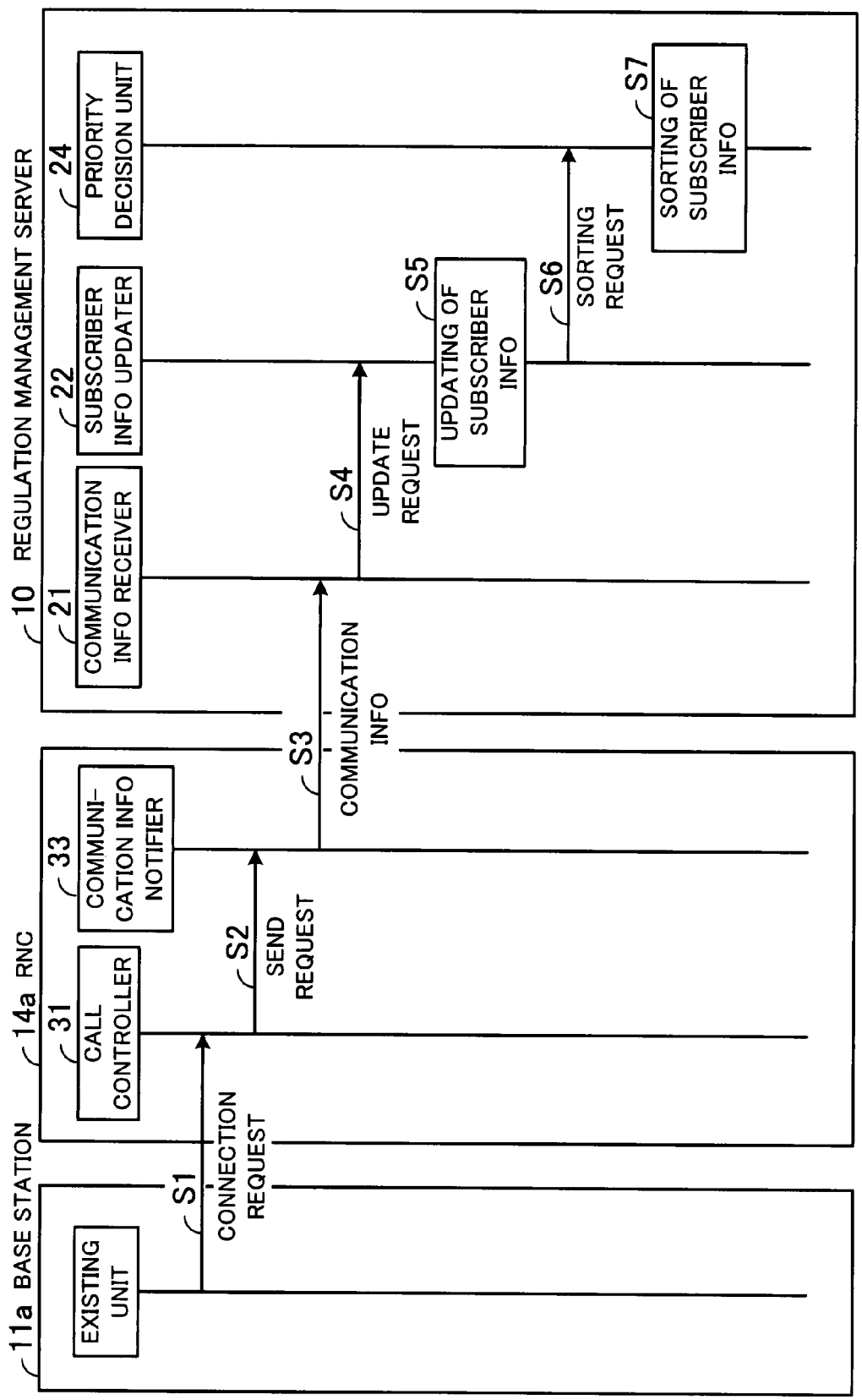
FIG. 13 is a first sequence diagram illustrating operation of the radio communication network.

FIG. 13 is a first sequence diagram illustrating the operation of the radio communication network.

Step S1: When a call request is received from a mobile unit, for example, the base station 11a sends a call connection request to the RNC 14a by means of an existing unit.

Step S2: On receiving the call connection request from the base station 11a, the call controller 31 of the RNC 14a initiates call control. Also, the call controller 31 sends the communication information notifier 33 the communication information about the mobile unit (subscriber) from which the call request has been received, and requests the notifier 33 to transmit the communication information.

Step S3: In response to the request from the call controller 31, the communication information notifier 33 of the RNC 14a transmits the communication information to the terminal regulation management server 10.

Step S4: On receiving the communication information from the RNC 14a, the communication information receiver 21 of the terminal regulation management server 10 requests the subscriber information updater 22 to update the subscriber information.

Step S5: In response to the update request from the communication information receiver 21, the subscriber information updater 22 of the terminal regulation management server 10 updates the station-based subscriber information management table 23 storing the subscriber information for the individual base stations.

Step S6: After the updating of the station-based subscriber information management table 23 is completed, the subscriber information updater 22 of the terminal regulation management server 10 requests the priority decision unit 24 to sort the preferential subscriber information.

Step S7: In response to the sorting request from the subscriber information updater 22, the priority decision unit 24 of the terminal regulation management server 10 updates the corresponding communication count in the station-based preferential subscriber information table 25, in accordance with the updated subscriber information management table 23. Then, the priority decision unit 24 sorts the preferential subscriber information of the station-based preferential subscriber information table 25 according to the communication count.

In this manner, when a call request is received from a mobile unit, the RNC 14a transmits the communication information on the mobile unit to the terminal regulation management server 10. On receiving the communication information, the terminal regulation management server 10 updates the station-based subscriber information management table 23 storing the subscriber information in association with the individual base stations, then updates the station-based preferential subscriber information table 25, and determines the order of priority of subscribers. This enables the terminal regulation management server 10 to hold the preferential subscriber information showing subscribers whose incoming/outgoing calls are to be permitted during congestion.

The following describes how the preferential subscriber information is delivered from the terminal regulation management server 10 to the base station 11a.

Figure 14:
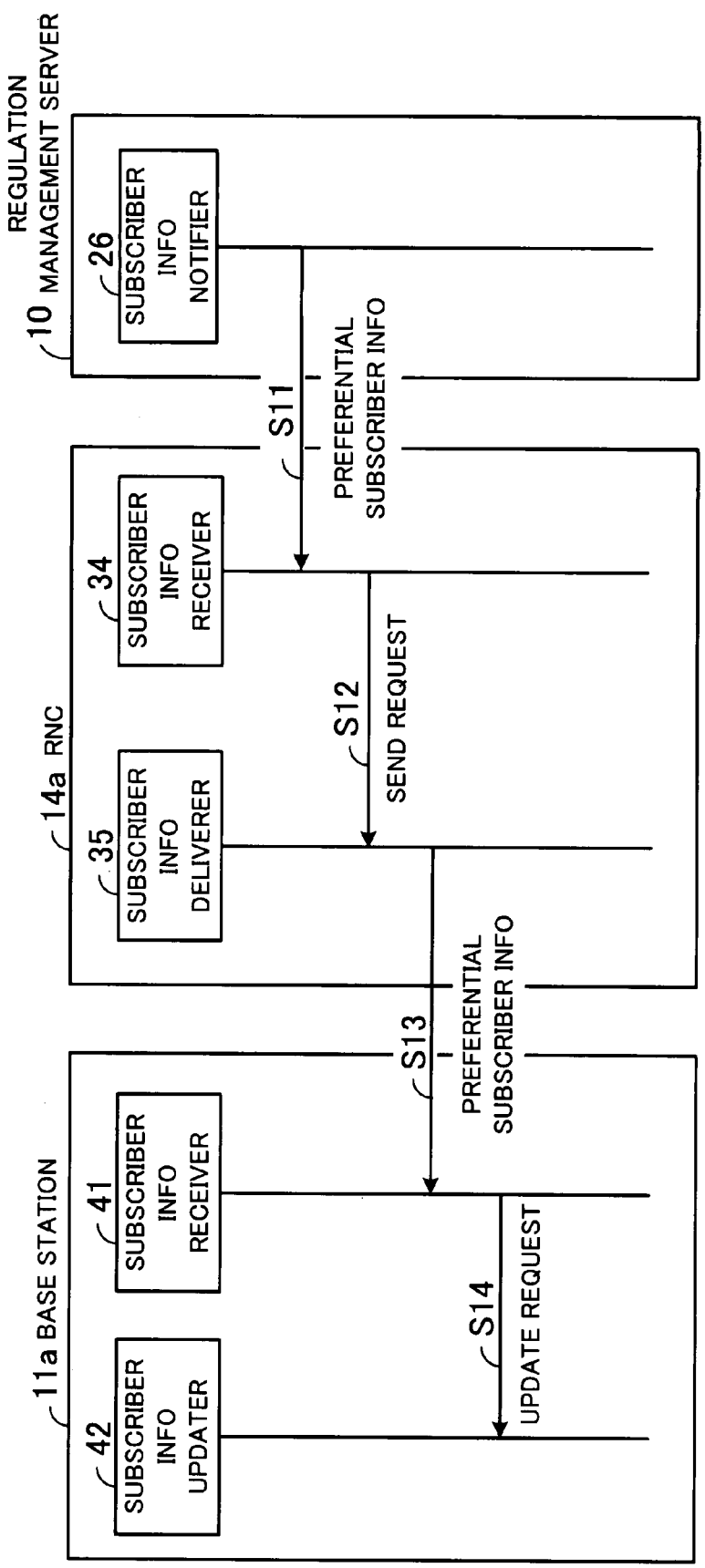
FIG. 14 is a second sequence diagram illustrating the operation of the radio communication network.

FIG. 14 is a second sequence diagram illustrating the operation of the radio communication network.

Step S11: The preferential subscriber information notifier 26 of the terminal regulation management server 10 acquires the preferential subscriber information stored in the station-based preferential subscriber information table 25, at specified intervals of time or in response to some suitable trigger, for example. Then, the notifier 26 transmits the acquired preferential subscriber information to the respective RNCs 14a to 14c connected with the base stations to which subscribers' mobile units belong.

Step S12: The preferential subscriber information receiver 34 of the RNC 14a receives, from the terminal regulation management server 10, the preferential subscriber information in which the subscriber information associated with the respective base stations is listed in order of priority. On receipt of the preferential subscriber information, the preferential subscriber information receiver 34 requests the preferential subscriber information deliverer 35 to send the preferential subscriber information.

Step S13: In response to the send request from the preferential subscriber information receiver 34, the preferential subscriber information deliverer 35 of the RNC 14a transmits the preferential subscriber information received by the receiver 34 to the base station 11a.

Step S14: The preferential subscriber information receiver 41 of the base station 11a receives the preferential subscriber information from the RNC 14a. After receiving the preferential subscriber information, the preferential subscriber information receiver 41 requests the preferential subscriber information updater 42 to update the preferential subscriber information.

In response to the update request, the preferential subscriber information updater 42 updates the preferential subscriber information table 43 in accordance with the preferential subscriber information received by the preferential subscriber information receiver 41.

In this manner, the terminal regulation management server 10 transmits the preferential subscriber information held thereby to the base station 11a via the RNC 14a. This allows the base station 11a to hold the preferential subscriber information showing subscribers whose incoming/outgoing calls are to be permitted during congestion.

The operation of the individual devices will be now explained with reference to flowcharts. First, updating of the subscriber information in the terminal regulation management server 10 will be described.

Figure 15:
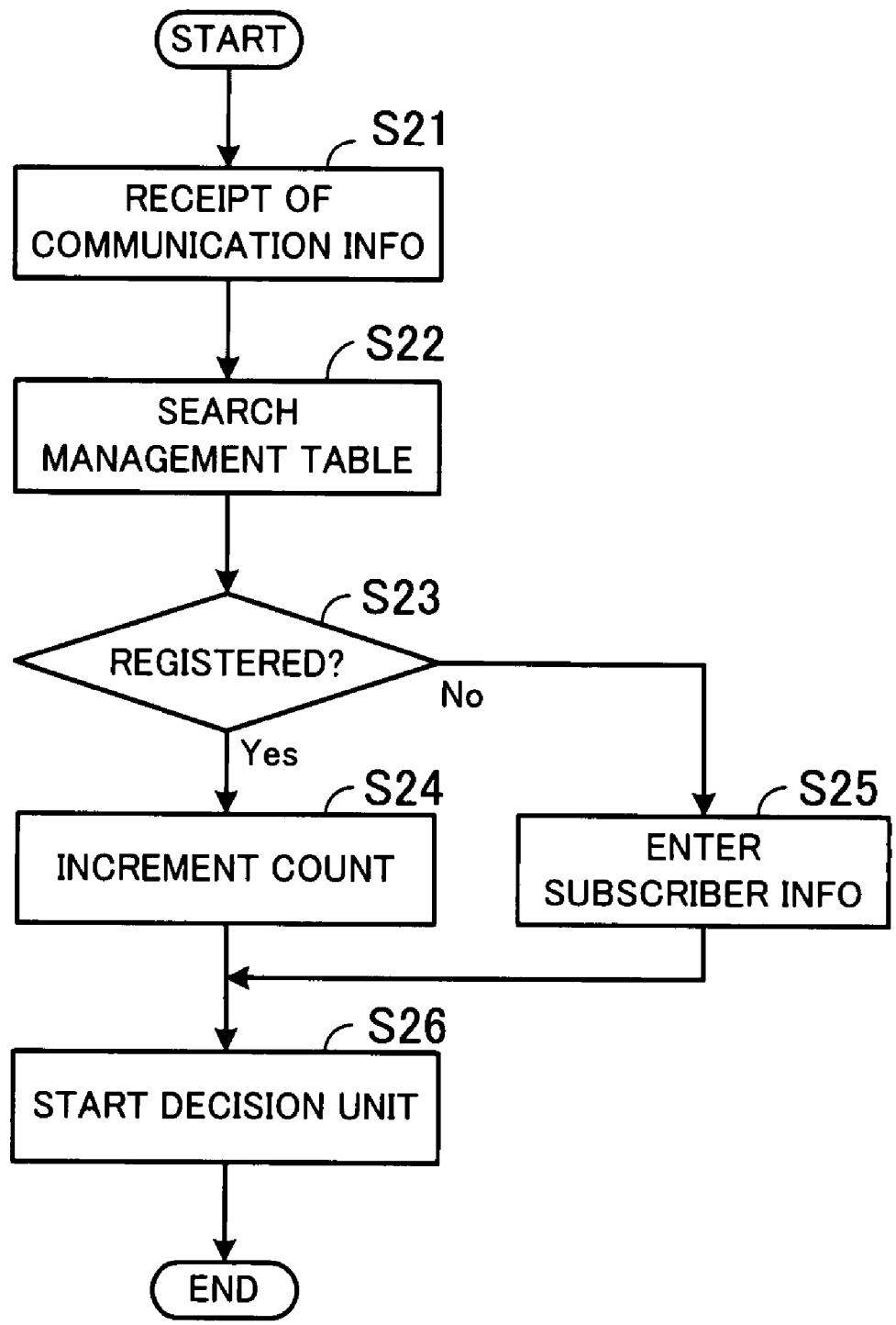
FIG. 15 is a flowchart illustrating a subscriber information updating process executed by the terminal regulation management server.

FIG. 15 is a flowchart illustrating the subscriber information updating process executed by the terminal regulation management server.

Step S21: The subscriber information updater 22 of the terminal regulation management server 10 receives communication information from the RNCs 14a to 14c through the communication information receiver 21. For example, the updater 22 receives information such as the identifier (ID) of the RNC 14a, 14b or 14c, the ID of the base station with which the subscriber communicated, the subscriber ID, and the subscriber's communication time.

Step S22: Based on the communication information received by the communication information receiver 21, the subscriber information updater 22 of the terminal regulation management server 10 searches the station-based subscriber information management table 23. At this time, the subscriber's communication time is looked up to search the corresponding time area of the station-based subscriber information management table 23.

Step S23: The subscriber information updater 22 of the terminal regulation management server 10 determines whether or not the subscriber ID contained in the communication information is already registered in the station-based subscriber information management table 23. If the subscriber ID is already registered, the process proceeds to Step S24; if not, the process proceeds to Step S25.

Step S24: The subscriber information updater 22 of the terminal regulation management server 10 increments the corresponding communication count in the station-based subscriber information management table 23. As shown in FIG. 4, for example, the time zone (daytime zone or nighttime zone), RNC and base station concerned with the subscriber's communication are successively looked up to locate the subscriber, and the corresponding communication count is incremented, whereupon the process proceeds to Step S26.

Step S25: The subscriber information updater 22 of the terminal regulation management server 10 enters the subscriber information in the station-based subscriber information management table 23.

Step S26: The subscriber information updater 22 of the terminal regulation management server 10 activates the priority decision unit 24.

Thus, based on the communication information received from the RNCs 14a to 14c, the terminal regulation management server 10 creates and manages the subscriber information including subscribers' communication counts.

The following describes how the priority order is determined by the terminal regulation management server 10.

Figure 16:
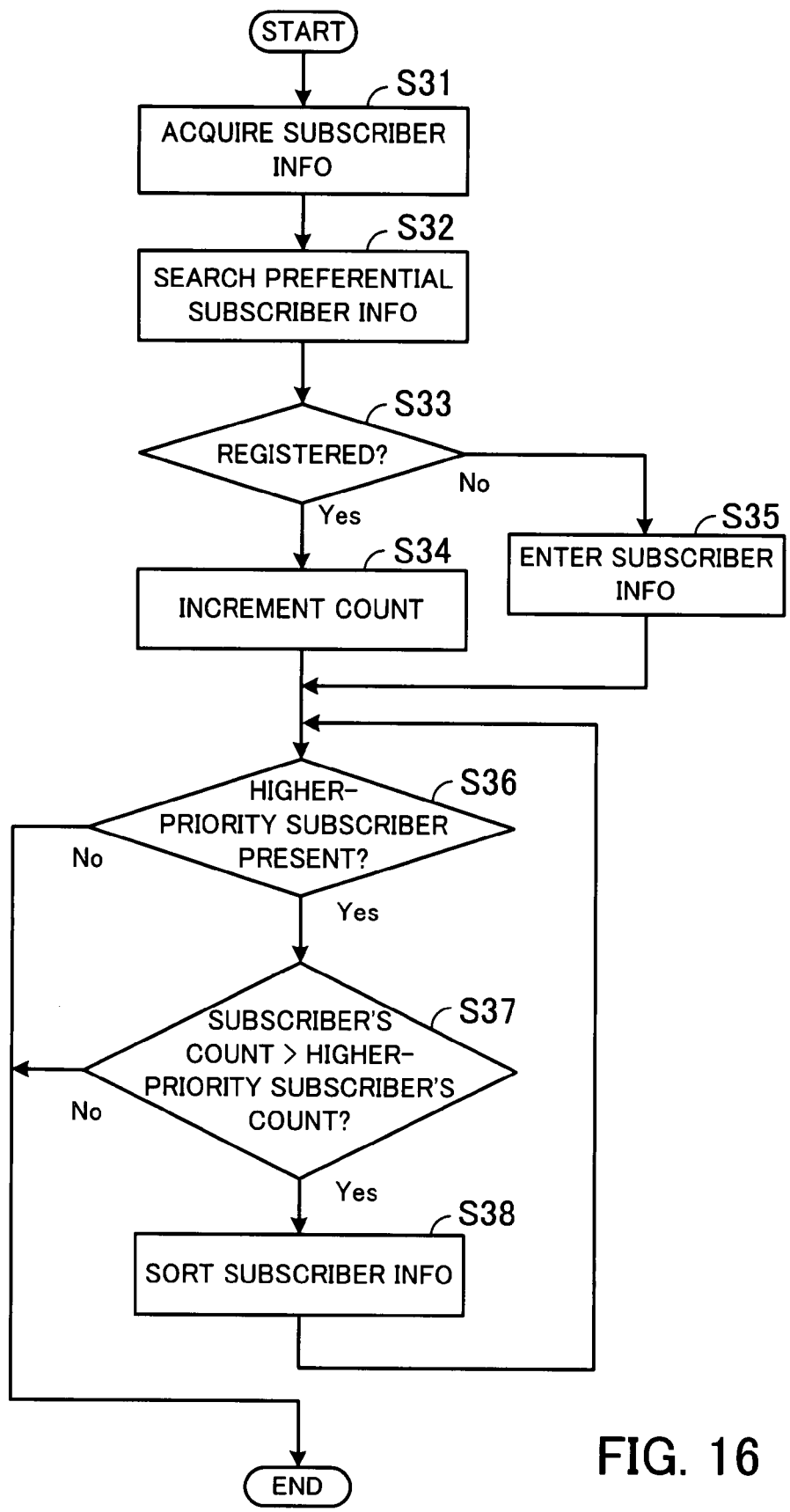
FIG. 16 is a flowchart illustrating a priority order decision process executed by the terminal regulation management server.

FIG. 16 is a flowchart illustrating the process executed by the terminal regulation management server to determine the priority order.

Step S31: The priority decision unit 24 of the terminal regulation management server 10 acquires, from the station-based subscriber information management table 23, the subscriber information of which the communication count has been incremented.

Step S32: Based on the acquired subscriber information, the priority decision unit 24 of the terminal regulation management server 10 searches the station-based preferential subscriber information table 25.

Step S33: The priority decision unit 24 of the terminal regulation management server 10 determines whether or not subscriber information corresponding to the acquired subscriber information is stored in the station-based preferential subscriber information table 25. If the corresponding subscriber information is stored in the station-based preferential subscriber information table 25, the process proceeds to Step S34; if not, the process proceeds to Step S35.

Step S34: The priority decision unit 24 of the terminal regulation management server 10 increments the corresponding communication count in the station-based preferential subscriber information table 25. As shown in FIG. 5, for example, the time zone (daytime zone or nighttime zone), RNC and base station concerned with the subscriber's communication are successively looked up to locate the subscriber, and the corresponding communication count is incremented, whereupon the process proceeds to Step S36.

Step S35: The priority decision unit 24 of the terminal regulation management server 10 enters the subscriber information in the station-based preferential subscriber information table 25.

Step S36: The priority decision unit 24 of the terminal regulation management server 10 determines whether or not there exists subscriber information having a priority level higher than that of the subscriber information which has just been entered or of which the communication count has been incremented. If there is a subscriber with a higher priority level, the process proceeds to Step S37. On the other hand, if there is no subscriber with a higher priority level, that is, if the subscriber in question has the highest priority level, the process ends.

Step S37: The priority decision unit 24 of the terminal regulation management server 10 determines whether or not the communication count of the subscriber in question is greater than that of the higher-priority subscriber. If the communication count of the subscriber in question is greater than that of the higher-priority subscriber, the process proceeds to Step S38; if the former is smaller than the latter, the process ends.

Step S38: The priority decision unit 24 of the terminal regulation management server 10 sorts the subscriber information in the station-based preferential subscriber information table 25, whereupon the process proceeds to Step S36. As shown in FIG. 5, for example, where "1" has been added to the communication count of the subscriber 1, the subscriber 1 comes after the subscriber c in terms of priority.

In this manner, the terminal regulation management server 10 determines the order of priority of subscribers according to which the incoming/outgoing calls of the subscribers are permitted during congestion.

The following describes how the subscriber-based regulation management table 47 is set in the base station 11a.

Figure 17:
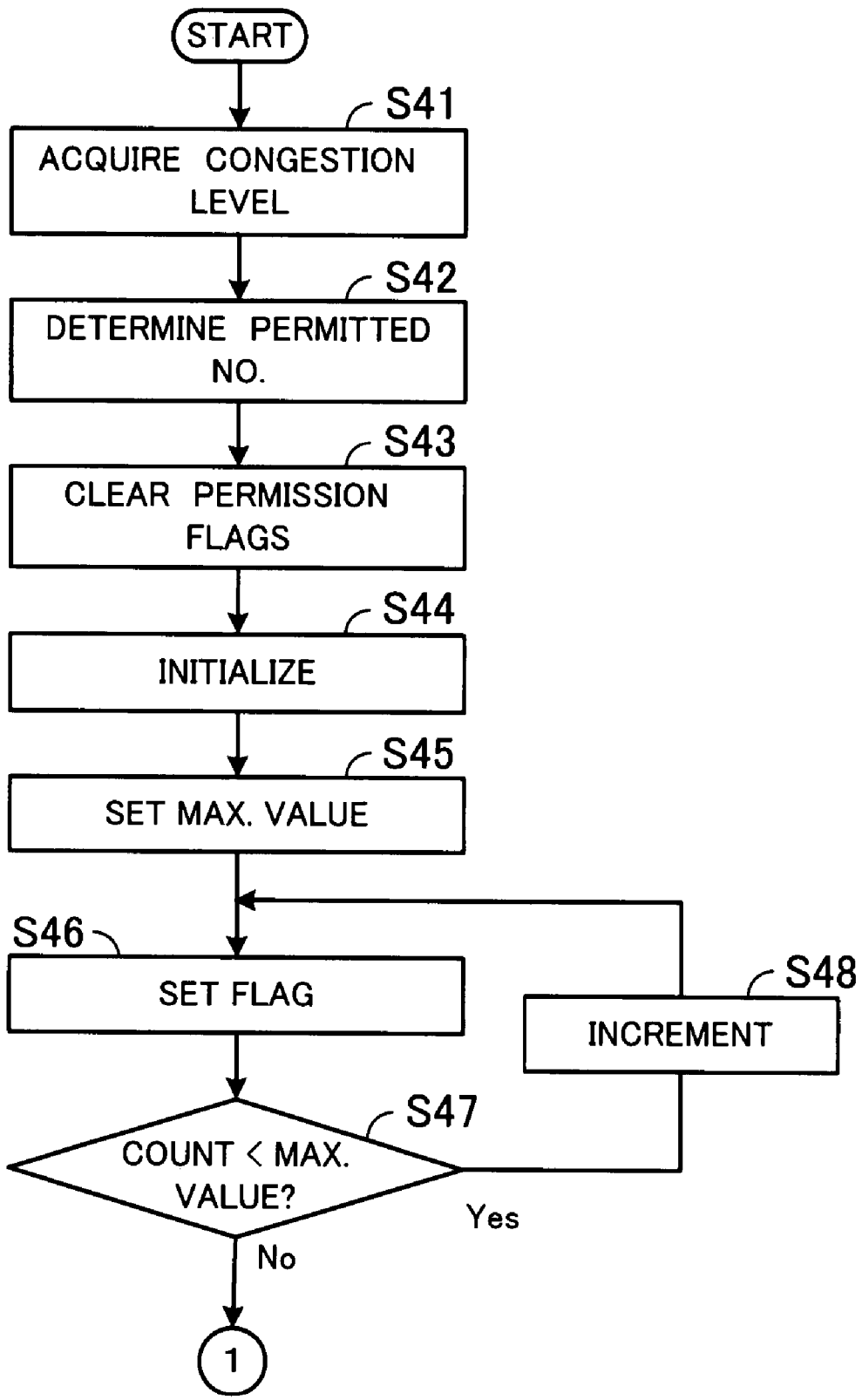
FIG. 17 is a flowchart illustrating a process of setting the subscriber-based regulation management table, executed by the base station.
Figure 18:
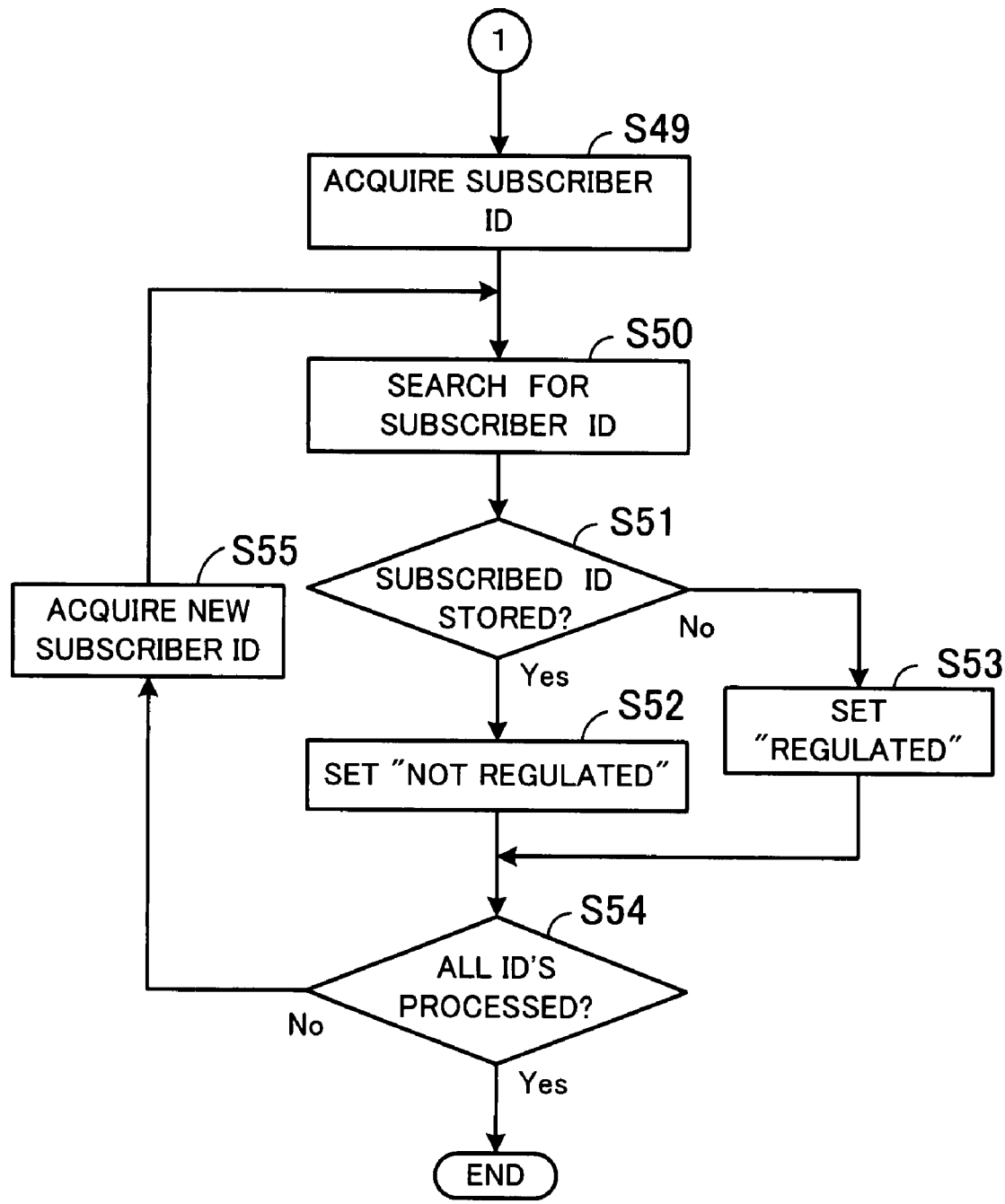
FIG. 18 is a flowchart also illustrating the process of setting the subscriber-based regulation management table, executed by the base station.

FIGS. 17 and 18 are flowcharts illustrating the process of setting the subscriber-based regulation management table, executed by the base station.

Step S41: The subscriber selector 46 of the base station 11a acquires the network congestion level from the congestion manager 44.

Step S42: The subscriber selector 46 of the base station 11a looks up the preferential subscriber number table 45 to determine the number of preferential subscribers corresponding to the acquired congestion level. If, in the example of FIG. 10, the congestion level is 75%, "20" is acquired as the number (permitted number) of preferential subscribers.

Step S43: The subscriber selector 46 of the base station 11a clears all communication permission flags in the preferential subscriber information table 43. For example, in the preferential subscriber information table 43 shown in FIG. 9, all of the communication permission flags are set to "0".

Step S44: The subscriber selector 46 of the base station 11a initializes a flag setting counter so as to point to the top subscriber in the preferential subscriber information table 43. In the preferential subscriber information table 43 shown in FIG. 8, for example, the flag setting counter points to the subscriber c upon initialization.

Each time the flag setting counter is incremented, it points to a subscriber with the next lower priority level. In the example of FIG. 8, the flag setting counter successively points to the subscribers c, 1, a, n, . . . , b.

Step S45: The subscriber selector 46 of the base station 11a sets the number of preferential subscribers, acquired in Step S42, as the maximum value of the flag setting counter.

Step S46: The subscriber selector 46 of the base station 11a sets "1" for the communication permission flag in the preferential subscriber information table 43.

Step S47: The subscriber selector 46 of the base station 11a determines whether or not the count of the flag setting counter is smaller than the maximum value set in Step S45. If the count is smaller than the maximum value, the process proceeds to Step S48. On the other hand, if the count is not smaller than the maximum value, that is, if the count has reached the maximum value, the process proceeds to Step S49.

Step S48: The subscriber selector 46 of the base station 11a increments the count of the flag setting counter by "1", whereupon the process proceeds to Step S46.

Step S49: The subscriber selector 46 of the base station 11a acquires a subscriber ID from the subscriber-based regulation management table 47.

Step S50: Based on the subscriber ID acquired in Step S49, the subscriber selector 46 of the base station 11a searches the preferential subscriber information table 43.

Step S51: The subscriber selector 46 of the base station 11a determines whether or not the acquired subscriber ID is stored in the preferential subscriber information table 43. If the subscriber ID is stored in the table 43, the process proceeds to Step S52; if not, the process proceeds to Step S53.

Step S52: The subscriber selector 46 of the base station 11a acquires the communication permission flag associated with the located subscriber ID stored in the preferential subscriber information table 43. Then, the subscriber selector sets the regulation flag of the corresponding subscriber ID in the subscriber-based regulation management table 47 to "not regulated".

Suppose, for example, that the subscriber ID acquired in Step S49 is "a". In this case, the communication permission flag of the subscriber a stored in the preferential subscriber information table 43 of FIG. 9 is "1", and accordingly, the regulation flag of the subscriber a shown in FIG. 11 is set to "not regulated".

Step S53: The subscriber selector 46 of the base station 11a sets the regulation flag of the corresponding subscriber ID in the subscriber-based regulation management table 47 to "regulated".

Step S54: The subscriber selector 46 of the base station 11a determines whether or not Steps S50 to S53 have been executed for all subscribers IDs in the subscriber-based regulation management table 47. If all subscriber IDs have been processed, the process ends; if not, the process proceeds to Step S55.

Step S55: The subscriber selector 46 of the base station 11a acquires a new subscriber ID to be processed, from the subscriber-based regulation management table 47.

In this manner, the base station 11a sets information about subscribers whose incoming/outgoing calls are to be regulated, in the subscriber-based regulation management table 47. The regulation controller 48 of the base station 11a looks up the subscriber-based regulation management table 47 to regulate subscriber's incoming/outgoing calls, whereby the incoming/outgoing calls of subscribers can be regulated according to the congestion level.

Also, the preferential subscriber information is managed separately for different time zones. This makes it possible to provide subscribers with communication means so as to match their life style, with the preferential area set to the vicinity of office in the daytime and to the vicinity of home in the nighttime, for example.

In the above description, the terminal regulation management server receives the communication information from the RNCs. The management server may alternatively receive the communication information from the base stations, and the preferential subscriber information may be delivered directly to the base stations, not via the RNCs.

In the terminal regulation management device of the present invention, the priority information is managed separately for the respective base stations, and the priority levels as to subscribers' incoming/outgoing calls are determined for the individual base stations. Thus, in cases where an unexpected incident or the like has occurred, it is possible to secure communications of users whose daily life zone overlaps with the site of the incident as well as of users whose daily life zone is outside the site.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A terminal regulation management device for regulating incoming/outgoing calls of radio terminals, comprising:
a priority information memory to store, individually for each base station included in a group of base stations, priority information indicating priority levels of subscribers in processing incoming/outgoing calls, and including communication counts that indicate how many times the subscribers have communicated using the respective radio terminals;
a communication information receiver to receive communication information about communications of the radio terminals from the base stations or from a radio network controller for controlling the base stations;
a priority decision unit to update the priority information stored in the priority information memory by updating the communication counts included therein, based on the received communication information, and determining the priority levels of the subscribers in accordance with the updated communication counts; and
a priority information transmitter to transmit the priority information stored in the priority information memory to the base stations, so as to cause the receiving base stations to select, in descending order of the priority levels indicated by the priority information received from the priority information transmitter, as many subscribers as determined according to a network congestion level and to regulate incoming/outgoing calls of the radio terminals associated with the selected subscribers.

2. The terminal regulation management device according to claim 1, wherein, when the communication information is received by the communication information receiver, the priority decision unit increments the corresponding communication count by "1".

3. The terminal regulation management device according to claim 1, wherein the priority information transmitter periodically transmits the priority information to the base stations.

4. The terminal regulation management device according to claim 1, wherein the priority information transmitter transmits the priority information to the base stations via the radio network controller.

5. The terminal regulation management device according to claim 1, wherein the priority information memory manages the priority information separately for respective different time zones.

6. The terminal regulation management device according to claim 1, wherein the communication information includes an identifier of the subscriber, an identifier of the base station with which the subscriber communicated, and a communication time.

7. The terminal regulation management device according to claim 6, wherein the priority decision unit determines the priority levels of the subscribers, based on information included in the communication information besides the communication counts.

8. The terminal regulation management device according to claim 1, wherein the priority information transmitter transmits the priority information directly to the base stations.

9. A radio communication system comprising:
a plurality of radio terminals used by respective subscribers;
a plurality of base stations, each comprising:
  a congestion manager to monitor a network congestion level,
  a subscriber selector to select, in descending order of priority levels indicated by priority information that is received, as many subscribers as determined according to the network congestion level being monitored by the congestion manager, and
  a regulation controller to regulate incoming/outgoing calls of the radio terminals, based on the priority levels of the corresponding subscribers which are indicated by the received priority information, so as to permit the radio terminals associated with the selected subscribers to originate and receive calls;
a radio network controller to control the base stations; and
a terminal regulation management device comprising:
  a priority information memory to store, individually for each base station, the priority information indicating priority levels of the subscribers in processing incoming/outgoing calls, and including communication counts that indicate how many times the subscribers have communicated using the respective radio terminals,
  a communication information receiver to receive communication information from the base stations or from the radio network controller,
  a priority decision unit to update the priority information stored in the priority information memory by updating the communication counts included therein, based on the received communication information, and determining the priority levels of the subscribers in accordance with the updated communication counts, and
  a priority information transmitter to transmit the priority information stored in the priority information memory to the base stations.

10. The radio communication system according to claim 9, wherein, when the communication information is received by the communication information receiver, the priority decision unit increments the corresponding communication count by "1".

11. The radio communication system according to claim 9, wherein the priority information transmitter periodically transmits the priority information to the base stations.

12. The radio communication system according to claim 9, wherein the priority information transmitter in the terminal regulation management device transmits the priority information to the base stations via the radio network controller.

13. The radio communication system according to claim 9, wherein the priority information transmitter in the terminal regulation management device transmits the priority information directly to the base stations.

14. The radio communication system according to claim 9, wherein the priority information memory manages the priority information separately for respective different time zones.

15. The radio communication system according to claim 9, wherein the communication information includes an identifier of the subscriber, an identifier of the base station with which the subscriber communicated, and a communication time.

16. The radio communication system according to claim 15, wherein the priority decision unit determines the priority levels of the subscribers, based on information included in the communication information besides the communication counts.

* * * * *